United States Patent
Ga et al.

(10) Patent No.: US 11,981,168 B2
(45) Date of Patent: May 14, 2024

(54) APPARATUS AND METHOD FOR PROVIDING TIRE INFORMATION

(71) Applicants: Hyundai Motor Company, Seoul (KR); Kia Motors Corporation, Seoul (KR)

(72) Inventors: Han Seon Ga, Gyeonggi-do (KR); Joon Sang Jo, Gyeonggi-do (KR); Hyun Dong Her, Seoul (KR); Myung Ki Yeom, Incheon (KR); Ju Yong Kang, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 249 days.

(21) Appl. No.: 16/835,924

(22) Filed: Mar. 31, 2020

(65) Prior Publication Data
US 2021/0053403 A1 Feb. 25, 2021

(30) Foreign Application Priority Data
Aug. 23, 2019 (KR) .................. 10-2019-0103860

(51) Int. Cl.
*B60C 23/06* (2006.01)
*G07C 5/00* (2006.01)
*G07C 5/08* (2006.01)

(52) U.S. Cl.
CPC ............ *B60C 23/062* (2013.01); *G07C 5/006* (2013.01); *G07C 5/0808* (2013.01)

(58) Field of Classification Search
None
See application file for complete search history.

(56) References Cited

U.S. PATENT DOCUMENTS 5,412,584 A 5/1995 Umeno et al.
5,699,251 A * 12/1997 Mori ...................... B60C 23/061
340/444

(Continued)

FOREIGN PATENT DOCUMENTS

CN 1752731 A 3/2006
DE 102005004910 A1 9/2005

(Continued)

OTHER PUBLICATIONS

Notification of the First Office Action for Chinese Patent Application No. 202010314101.1, from The National Intellectual Property Administration, PRC, issued Jan. 30, 2024, with English translation, 19 pages.

(Continued)

*Primary Examiner* — Rachid Bendidi
*Assistant Examiner* — Selena M Jin
(74) *Attorney, Agent, or Firm* — Fox Rothschild LLP

(57) ABSTRACT

An apparatus for providing tire information is provided. The apparatus includes a detector that detects driving information as a vehicle is being driven and a controller that calculates a relative speed of a tire of the vehicle and a resonance frequency of the tire based on the driving information. The controller then compares the calculated relative speed and the calculated resonance frequency with a previously learned determination reference value to determine whether the tire is deflated.

14 Claims, 11 Drawing Sheets

(56) References Cited

U.S. PATENT DOCUMENTS

| | | | |
|---|---|---|---|
| 5,712,616 A * | 1/1998 | Schmitt | G01P 3/56 |
| | | | 340/444 |
| 5,826,207 A | 10/1998 | Ohashi et al. | |
| 6,061,642 A | 5/2000 | Nakajima | |
| 6,591,670 B1 | 7/2003 | Umeno et al. | |
| 7,340,369 B2 | 3/2008 | Oshiro | |
| 2006/0006014 A1 * | 1/2006 | Yanase | B60C 23/061 |
| | | | 180/197 |
| 2006/0064238 A1 * | 3/2006 | Kitano | B60C 23/061 |
| | | | 701/31.4 |
| 2006/0076095 A1 | 4/2006 | Oshiro | |
| 2007/0000316 A1 * | 1/2007 | Lauer | B60C 23/0408 |
| | | | 73/146.4 |
| 2008/0276699 A1 * | 11/2008 | Edling | B60C 23/061 |
| | | | 73/146 |
| 2012/0007729 A1 * | 1/2012 | Patel | B60C 23/0471 |
| | | | 340/442 |
| 2012/0304754 A1 * | 12/2012 | Oshiro | B60C 23/062 |
| | | | 73/146 |
| 2018/0141394 A1 | 5/2018 | Yeom | |
| 2020/0324588 A1 * | 10/2020 | Yu | B60C 23/0442 |
| 2021/0188252 A1 * | 6/2021 | Lu | B60W 40/12 |

FOREIGN PATENT DOCUMENTS

| | | |
|---|---|---|
| JP | H06344734 A | 12/1994 |
| JP | H08268014 A | 10/1996 |
| JP | 2016-094067 A | 5/2016 |
| KR | 10-2015-0069048 A | 6/2015 |
| KR | 10-2015-0070458 A | 6/2015 |
| KR | 10-1816039 B1 | 1/2018 |

OTHER PUBLICATIONS

"Typical Vehicle Longitudinal Anti Slip Control System and Key Technologies", "Light Vehicle Technology" Issue 3, 2007, Zhu Zhonglun Department of Automotive and Mechanical Engineering, Anhui Transportation Vocational and Technical College, English Abstract, 8 pages.

* cited by examiner

| COMPARED RESULT OF FIRST RELATIVE SPEED | COMPARED RESULT OF SECOND RELATIVE SPEED | COMPARED RESULT OF THIRD RELATIVE SPEED | TIRE-PRESSURE DETERIORATION | | | THE NUMBER OF TIRES WHICH ARE DEFLATED |
|---|---|---|---|---|---|---|
| | | | FC(RC) | RL(FL) | RR(FR) | |
| + | 0 | − | ● | | | 1 |
| − | + | 0 | | ● | | |
| 0 | − | + | | | ● | |
| 0 | + | − | ● | ● | | 2 |
| + | − | 0 | ● | | ● | |
| − | 0 | + | | ● | ● | |
| 0 | 0 | 0 | | | | NORMAL |

| COMPARED RESULT OF FIRST RELATIVE SPEED | COMPARED RESULT OF SECOND RELATIVE SPEED | COMPARED RESULT OF THIRD RELATIVE SPEED | USE RESONANCE FREQUENCY CALCULATION INFORMATION | TIRE-PRESSURE DETERIORATION ||| THE NUMBER OF TIRES WHICH ARE DEFLATED |
|---|---|---|---|---|---|---|---|
| | | | | FC(RC) | RL(FL) | RR(FR) | |
| + | 0 | − | ● | ● | | | |
| − | + | 0 | | | ● | | 1 |
| 0 | − | + | | | | ● | |
| 0 | + | − | ● | ● | ● | | |
| + | − | 0 | ● | | ● | ● | 2 |
| − | 0 | + | | ● | | ● | |
| 0 | 0 | 0 | ● | ● | ● | ● | 3 |

(DRIVE ONE TIRE)

| | COMPARED RESULT OF FIRST RELATIVE SPEED | COMPARED RESULT OF SECOND RELATIVE SPEED | COMPARED RESULT OF THIRD RELATIVE SPEED | TIRE-PRESSURE DETERIORATION | | | USE FREQUENCY CALCULATION INFORMATION | THE NUMBER OF TIRES WHICH ARE DEFLATED |
|---|---|---|---|---|---|---|---|---|
| | | | | FC(RC) | RL(FL) | RR(FR) | | |
| DRIVE TWO TIRES | + | 0 | − | | | | | 1 |
| | − | + | 0 | ● | | | ● ● | |
| | 0 | − | + | | ● | ● | ● ● ● | 2 |
| | 0 | + | − | ● | ● | | ● ● | |
| | + | − | 0 | ● | ● | ● | ● ● | |
| | − | 0 | + | ● | | ● | ● | |
| | 0 | 0 | 0 | ● | ● | ● | ● | 3 |

FIG. 6

| | COMPARED RESULT OF FIRST RELATIVE SPEED | COMPARED RESULT OF SECOND RELATIVE SPEED | COMPARED RESULT OF THIRD RELATIVE SPEED | TIRE-PRESSURE DETERIORATION | | | USE FREQUENCY CALCULATION INFORMATION | THE NUMBER OF TIRES WHICH ARE DEFLATED |
|---|---|---|---|---|---|---|---|---|
| | | | | FC(RC) | RL(FL) | RR(FR) | | |
| | + | 0 | − | ● | | | ● | 1 |
| | − | + | 0 | | ● | | ● | |
| DRIVE THREE TIRES | 0 | − | + | | | ● | ● | |
| | 0 | + | − | ● | ● | | ● | 2 |
| | + | − | 0 | ● | | ● | ● | |
| | − | 0 | + | | ● | ● | ● | |
| | 0 | 0 | 0 | ● | ● | ● | ● | 3 |

FIG.7

APPARATUS AND METHOD FOR PROVIDING TIRE INFORMATION

CROSS-REFERENCE TO RELATED APPLICATION

This application is claims the benefit of priority to Korean Patent Application No. 10-2019-0103860, filed on Aug. 23, 2019, the entire contents of which are incorporated herein by reference.

TECHNICAL FIELD

The present disclosure relates to an apparatus and method for providing tire information, and more particularly, to an apparatus and method for providing tire information to manage tire pressure of a three-wheeled mobility vehicle.

BACKGROUND

Recently, as there has been an increase in the number of drivers desiring to use vehicles without owning the vehicles, there has been an increase in development of vehicle sharing. Unlike a rental car system, because the vehicle sharing is available for a shorter period of time, there has been a growing trend to use a three-wheeled mobility vehicle as well as a four-wheel drive vehicle to lend vehicles.

Meanwhile, managing tire pressure of the vehicle remains important for safe driving of the vehicle. Thus, technologies (e.g., a direct tire pressure monitoring system (TPMS)) for providing tire pressure information using a pressure sensor or technologies (e.g., an indirect TPMS) providing tire pressure information using information from another sensor have been developed. However, because the technologies of providing the tire pressure information are developed based on a four-wheel drive vehicle, it is difficult for the technologies to be applied to the three-wheeled mobility.

SUMMARY

The present disclosure provides an apparatus and method for providing tire information to manage tire pressure of a three-wheeled mobility. The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an apparatus for providing tire information may include: a detector configured to detect driving information as a vehicle is being driven and a controller configured to calculate a relative speed of a tire of the vehicle and a resonance frequency of the tire based on the driving information and compare the calculated relative speed and the calculated resonance frequency with a previously learned determination reference value to determine whether the tire is deflated.

The tire may include one front wheel, a left rear wheel, and a right rear wheel or may include a left front wheel, a right front wheel, and one rear wheel. The driving information may include at least any one of an angular velocity, a wheel speed, a vehicle speed, and/or a yaw rate of the tire. The relative speed may include a first relative speed between a front wheel and a left rear wheel, a second relative speed between the left rear wheel and a right rear wheel, and a third relative speed between the right rear wheel and the front wheel, when the tire includes the one front wheel, the left rear wheel, and the right rear wheel.

The determination reference value may include a first relative speed determination reference value, a second relative speed determination reference value, and a third relative speed determination reference value, which are learned after the first relative speed, the second relative speed, and the third relative speed are calculated based on the driving information collected during a particular time period after an input signal is input from a user, when the tire includes the one front wheel, the left rear wheel, and the right rear wheel. The controller may be configured to determine that the tire is deflated, when the relative speed of the tire is greater than the previously learned determination reference value. The controller may also be configured to calculate a resonance frequency of a driving tire based on the driving information collected during a particular time period after an input signal is input to an input device and may be configured to learn a resonance frequency determination reference value.

Additionally, the controller may be configured to calculate a resonance frequency of the driving tire, after learning the resonance frequency determination reference value, compare the learned resonance frequency determination reference value with the calculated resonance frequency to determine whether the driving tire is deflated, and determine whether there is a difference in wheel speed between the driving tire and a non-driving tire to determine whether the non-driving tire is deflated. The controller may also be configured to determine whether there is a change in weight of the vehicle and determine whether the tire is deflated by reflecting the changed weight when there is the change in weight of the vehicle. The controller may then be configured to output a warning in response to determining that the tire is deflated.

According to another aspect of the present disclosure, a method for providing tire information may include: detecting driving information as a vehicle is being driven and calculating a relative speed of a tire of the vehicle and a resonance frequency of the tire based on the driving information and comparing the calculated relative speed and the calculated resonance frequency with a previously learned determination reference value to determine whether the tire is deflated.

The tire may include one front wheel, a left rear wheel, and a right rear wheel or includes a left front wheel, a right front wheel, and one rear wheel. The driving information may include at least any one of an angular velocity, a wheel speed, a vehicle speed, and/or a yaw rate of the tire. The relative speed may include a first relative speed between a front wheel and a left rear wheel, a second relative speed between the left rear wheel and a right rear wheel, and a third relative speed between the right rear wheel and the front wheel, when the tire includes the one front wheel, the left rear wheel, and the right rear wheel.

The determination reference value may include a first relative speed determination reference value, a second relative speed determination reference value, and a third relative speed determination reference value, which are learned after the first relative speed, the second relative speed, and the third relative speed are calculated based on the driving information collected during a particular time period after an input signal is input from a user, when the tire includes the one front wheel, the left rear wheel, and the right rear wheel. The tire may be determined to be deflated when the relative speed of the tire is greater than the previously learned determination reference value.

The method may further include calculating a resonance frequency of a driving tire based on the driving information collected during a particular time period after an input signal is input and learning a resonance frequency determination reference value. The method may further include calculating a resonance frequency of the driving tire, after learning the resonance frequency determination reference value, comparing the learned resonance frequency determination reference value with the calculated resonance frequency to determine whether the driving tire is deflated, and determining whether there is a difference in wheel speed between the driving tire and a non-driving tire to determine whether the non-driving tire is deflated.

The method may further include determining whether there is a change in weight of the vehicle and determining whether the tire is deflated by reflecting the changed weight, when there is the change in weight of the vehicle. The method may further include outputting a warning, in response to determining that the tire is deflated.

BRIEF DESCRIPTION OF THE DRAWINGS

The above and other objects, features and advantages of the present disclosure will be more apparent from the following detailed description taken in conjunction with the accompanying drawings:

FIG. 4 is illustrates a logic table for determining tire deflation based on a calculated relative speed of a tire according to an exemplary embodiment of the present disclosure;

FIGS. 5, 6, and 7 illustrate logic tables for determining tire deflation based on a tire drive technique according to an exemplary embodiment of the present disclosure;

DETAILED DESCRIPTION

Figure 1:
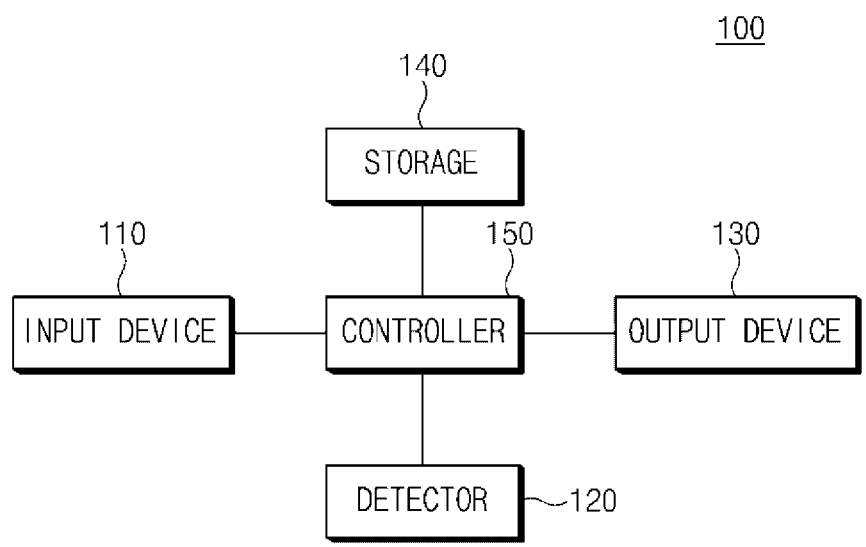
FIG. 1 is a block diagram illustrating a configuration of an apparatus for providing tire information according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

As shown in FIG. 1, an apparatus 100 for providing tire information according to an exemplary embodiment of the present disclosure may include an input device 110, a detector 120, an output device 130, a storage 140, and a controller 150. The controller 150 may be configured to operate the other components of the apparatus. The input device 110 may be configured to receive an input signal in response to a manipulation, an operation, or a voice of a passenger (e.g., user input). When the input signal is input to the input device 110, the controller 150 may be configured to enter a learning mode. The input device 110 may be implemented as a scroll wheel, a button, a knob, a touch screen, a touch pad, a lever, a track ball, or the like, operable by a passenger, or may be implemented by at least one of an operation sensor and/or a speed recognition sensor configured to sense an operation and/or voice of the passenger or by a combination thereof.

The detector 120 may be configured to detect driving information of a vehicle. Accordingly, the detector 120 may include a plurality of sensors. The plurality of sensors may include a wheel sensor, a speed sensor, a weight sensor, and a yaw sensor, which are provided within a tire. The detector 120 may be configured to detect at least one of an angular velocity, a wheel speed, a vehicle speed, and/or a yaw rate of the tire.

When the controller 150 determines to output a warning, the output device 130 may be configured to output a warning message as an image or audio output. Accordingly, the output device 130 may include a display configured to output visual information and a sound output device configured to output audible information. The display may be implemented as a display device employing a liquid crystal display (LCD) panel, a light emitting diode (LED) panel, an organic LED (QLED) panel, a plasma display panel (PDP) panel, or the like. The LCD panel may include a thin film transistor-LCD (TFT-LCD) panel. According to an exemplary embodiment of the present disclosure, the output device 130 may be integrally implemented with the input device 110 by a touch screen panel (TSP). Furthermore, the sound output device may be implemented using a speaker or a related component which outputs a sound.

The storage 140 may be configured to store an algorithm for an operation of the controller 150. In particular, the storage 140 may be configured to store information learned by the controller 150. The storage 140 may include at least one of a flash memory, a hard disc, a memory card, a read-only memory (ROM), a random access memory (RAM), an electrically erasable programmable ROM (EEPROM), a programmable ROM (PROM), a magnetic memory, a magnetic disc, and/or an optical disc.

The controller 150 may be implemented by various processing devices such as a microprocessor and the like, in which a semiconductor chip or the like capable of calculating or executing various commands is embedded, and may be configured to execute an overall operation of the apparatus 100 for providing the tire information according to an exemplary embodiment of the present disclosure. In particular, the controller 150 may be configured to determine whether the tire is deflated, based on a determination reference value previously learned using the driving information detected by the detector 120 and the resonance frequency of the tire.

Figure 2:
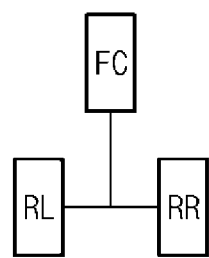
FIG. 2 is illustrates a tire arrangement according to an exemplary embodiment of the present disclosure.
Figure 3:
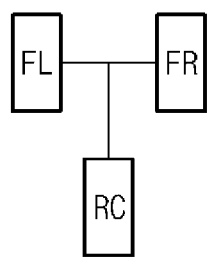
FIG. 3 is illustrates a tire arrangement according to another exemplary embodiment of the present disclosure.

The controller 150 may be configured to collect driving information detected by the detector 120 during a particular time period after the input signal is input to the input device 110. The controller 150 may then be configured to calculate a relative speed of a driving tire wheel based on the collected driving information and learn a determination reference value based on the calculated result. The controller 150 according to an exemplary embodiment of the present disclosure may be configured to determine whether three tires provided in a mobility are deflated. Accordingly, the controller 150 may be configured to calculate a relative speed between a driving wheel and a non-driving wheel based on a tire driving technique and may be configured to learn a determination reference value based on the calculated result. As shown in FIG. 2, the three tires may be arranged as one front wheel FC and two rear wheels RL and RR. Alternatively, as shown in FIG. 3, the three tires may be arranged as two front wheels FL and FR and one rear wheel RC.

As an example, when the three tires are driven using an internal combustion engine or an electric motor, one or two of the three tires may be driven. In particular, since a difference occurs in dynamic radius between one driving wheel and two non-driving wheels, the controller 150 may be configured to calculate a relative speed between the driving wheel and the non-driving wheel and learn a determination reference value based on the calculated result. Furthermore, when the three tires are driven using an in-wheel motor, all the three tires may be driven. In particular, when a driving force is equally divided among the three tires, since a difference in dynamic radius does not occur, there is no need to calculate a relative speed. However, when a driving force is differentially divided among the three tires, since a difference occurs in dynamic radius in the three tires, the controller 150 may be configured to calculate a relative speed among the three tires and learn a determination reference value based on the calculated result.

According to an exemplary embodiment, when tires are arranged as one front wheel FC and two rear wheels RL and RR, the controller 150 may be configured to calculate a first relative speed between the front wheel FC and the rear wheel RL, a second relative speed between the rear wheels RL and RR, and a third relative speed between the rear wheel RR and the front wheel FC, based on driving information collected during a particular time period after the input signal is input. According to another exemplary embodiment, when tires are arranged as two front wheels FL and FR and one rear wheel RC, the controller 150 may be configure to calculate a first relative speed between the front wheel FL and the rear wheel RC, a second relative speed between the rear wheel RC and the front wheel FR, and a third relative speed between the front wheels FR and FL.

The controller 150 may be configured to calculate the first relative speed with: (a wheel speed of the front wheel FC−a wheel speed of the left rear wheel RL)/a vehicle speed, calculate the second relative speed with: (a wheel speed of the left rear wheel RL−a wheel speed of the right rear wheel RR)/a vehicle speed, and calculate the third relative speed with: (a wheel speed of the right rear wheel RR−a wheel speed of the front wheel FC)/a vehicle speed.

After performing the learning, the controller 150 may be configured to enter a tire pressure detection mode and determine whether a tire is deflated. When entering the tire pressure detection mode, the controller 150 may be configured to obtain driving information detected by the detector 120 and calculate the first to third relative speeds based on the obtained driving information. Furthermore, the controller 150 may be configured to compare the first to third relative speeds calculated after entering the tire pressure detection mode with first to third relative speed determination reference values learned in a learning mode to determine whether the tire is deflated. The controller 150 may be configured to compare the calculated relative speed with the learned relative speed determination reference value.

When the calculated relative speed is greater than the learned relative speed determination reference value, the controller 150 may be configured to determine the compared result as '+' (e.g., when a dynamic radius of the tire pressure detection mode is greater than a dynamic radius of the learning mode, the controller 150 may be configured to determine the compared result as a difference in dynamic radius due to tire deflation rather than a difference between a driving wheel and a non-driving wheel). When the calculated relative speed is equal to the learned relative speed determination reference value, the controller 150 may be configured to determine the compared result as '0' (e.g., there is no difference in dynamic radius between the learning mode and the tire pressure detection mode). When the calculated relative speed is less than the learned relative speed determination reference value, the controller 150 may be configured to determine the compared result as '−' (e.g., the dynamic radius of the tire pressure detection mode is less than the dynamic radius of the learning mode). A detailed description will be given of it with reference to FIG. 4.

As shown in FIG. 4, when one tire is driven, the controller 150 may be configured to determine whether any one of the three tires is deflated and a location of the any one of the three tires, based on the compared result. As an example, in response to determining that the calculated first relative speed is greater than a learned first relative speed determination reference value, that the calculated second relative speed is equal to a learned second relative speed determination reference value, and that the calculated third relative speed is less than a learned third relative speed determination reference value, the controller 150 may be configured to determine the compared results as '+', '0', and '−', respectively. In this case, the controller 150 may be configured to determine that the tire of the front wheel FC is deflated.

Furthermore, as shown in FIG. 4, when two tires are driven, the controller 150 may be configured to determine whether at least two of the three tires are deflated and locations of the at least two of the three tires, based on the compared result. As an example, in response to determining that the calculated first relative speed is equal to the learned first relative speed determination reference value, that the calculated second relative speed is greater than the learned second relative speed determination reference value, and that the calculated third relative speed is less than the learned third relative speed determination reference value, the controller 150 may be configured to determine the compared results as '0', '+', and '−', respectively. In this case, the controller 150 may be configured to determine that the tires of the front wheel FC and the left rear wheel RL are deflated.

Furthermore, as shown in FIG. 4, when three tires are driven, the controller 150 may be configured to determine whether the three tires are deflated and locations of the three tires, based on the compared result. As an example, in response to determining that the calculated first relative speed is equal to the learned first relative speed determination reference value, that the calculated second relative speed is equal to the learned second relative speed determination reference value, and that the calculated third relative speed is equal to the learned third relative speed determination reference value, the controller 150 may be configured to determine the compared results as '0', '0', and '0', respectively. However, the controller 150 may be unable to determine whether the three tires are deflated, based on only the compared results. Thus, in this case, the controller 150 may be configured to determine whether the three tires are deflated, using a resonance frequency. Hereinafter, a description will be given in detail of a configuration for determining whether the three tires are deflated using the resonance frequency.

Particularly, the controller 150 may be configured to calculate a resonance frequency based on driving information collected during a particular time period after the input signal is input to the input device 110 and learn a resonance frequency determination reference value. Since the resonance frequency may be calculated for a driving wheel and but not easily calculated for a non-driving wheel, the controller 150 may be configured to calculate the resonance frequency based on a driving wheel driven according to a tire drive technique and may be configured to learn a resonance frequency determination reference value.

After performing the learning, the controller 150 may be configured to enter a tire pressure detection mode and determine whether the tire is deflated. When entering the tire pressure detection mode, the controller 150 may be configured to obtain driving information detected by the detector 120 and calculate a resonance frequency of a driving wheel based on the obtained driving information.

Furthermore, the controller 150 may be configured to compare the resonance frequency calculated after entering the tire pressure detection mode with a resonance frequency determination reference value learned in a learning mode to determine whether the tire is deflated. The controller 150 may then be configured to compare a resonance frequency calculated in the driving wheel with a resonance frequency determination reference value learned in the driving wheel. When the calculated resonance frequency is less than the learned resonance frequency determination reference value, the controller 150 may be configured to determine that the resonance frequency is reduced to determine that the tire is deflated.

As an example, when at least any one of the three tires is driven according to a tire drive technique and in response to determining that the resonance frequency is reduced since the resonance frequency of the driving wheel is less than the learned resonance frequency determination reference value, the controller 150 may be configured to determine that the tire of the driving wheel is deflated. Herein, when at least any one of the three tires is driven, the controller 150 may be configured to determine that the driving wheel is a front wheel FC or a rear wheel RC. Thus, when the driving wheel is the front wheel FC or the rear wheel RC, the controller 150 may be configured to calculate a resonance frequency of the front wheel FC or the rear wheel RC and determine whether a tire of the front wheel FC or the rear wheel RC is deflated.

Further, the controller 150 may be configured to determine a difference in wheel speed between one driving wheel and two non-driving wheels. In response to determining that there is no difference in wheel speed between the two non-driving wheels, the controller 150 may be configured to determine that tires of the two non-driving wheels are deflated (i.e., that all the three tires are deflated). Additionally, in response to determining that there is a difference in wheel speed of any one of the two non-driving wheels and that there is no difference in wheel speed of the other non-driving wheel, the controller 150 may be configured to determine that the two tires (e.g., the driving wheel and the non-driving wheel) are deflated and determine that the other tire (e.g., the non-driving wheel) has normal (e.g., sufficient) tire pressure.

As another example, when at least two of the three tires are driven according to the tire drive technique and in response to determining that a resonance frequency of the driving wheel is reduced since the resonance frequency of the driving wheel is less than the learned resonance frequency determination reference value, the controller 150 may be configured to determine that the tires of the two driving wheels are deflated. Herein, when at least any two of the three tires are driven, the controller 150 may be configured to determine that the driving wheels are two rear wheels RL and RR or two front wheels FL and FR. Thus, when the driving wheels are the front wheels FL and FR or the rear wheels RL and RR, the controller 150 may be configured to determine whether the tires of the front wheels FL and FR or the rear wheels RL and RR are deflated.

The controller 150 may be configured to determine a difference in wheel speed of the other one non-driving wheel. In response to determining that there is no difference in wheel speed of the non-driving wheel, the controller 150 may be configured to determine that the tire of the non-driving wheel is deflated (i.e., that all the three tires are deflated). Furthermore, in response to determining that there is a difference in wheel speed of the non-driving wheel, the controller 150 may be configured to determine that the non-driving wheel has normal tire pressure (e.g., that the two tires are deflated and the one tire has normal or sufficient tire pressure).

As another example, when at least two of the three tires are driven according to the tire drive technique and in response to determining that a resonance frequency of the driving wheel is reduced since the resonance frequency of the driving wheel is less than the learned resonance frequency determination reference value, the controller 150 may be configured to determine that the tires of the driving wheels (e.g., the three tires) are deflated. Thus, when whether the three tires are deflated is unable to be determined based on the relative speed, the controller 150 may be configured to determine whether the three tires are deflated, based on the calculated resonance frequency.

To more accurately determine whether the tire is deflated, the controller 150 may be configured to determine a factor capable of having an influence on a wheel speed of the tire and determine whether to correct the wheel speed. First of all, when the vehicle is loaded with passengers and cargo, the controller 150 may be configured to estimate a weight of the vehicle including a weight of the cargo and determine whether there is a change in the weight of the vehicle. When determining that there is the change in the weight of the vehicle, entering a tire pressure detection mode, and calculating a relative speed or a resonance frequency, the controller 150 may be configured to calculate a correction coefficient capable of correcting a wheel speed based on the changed weight and may be configured to correct a wheel speed changed by the weight using the correction coefficient.

In other words, the controller 150 may be configured to determine whether deterioration in tire dynamic radius is caused by a change in weight or tire deflation in the tire pressure detection mode. When the deterioration in tire dynamic radius is caused by the change in weight, the controller 150 may be configured to correct the wheel speed to prevent the wheel speed from changing. Furthermore, when the vehicle is being driven on a curved road, the controller 150 may be configured to correct a difference in wheel speed between one front wheel FC and two rear wheels RL and RR or a difference in wheel speed between two front wheels FL and FR and one rear wheel RC, which occurs due to a difference in the turn radius of the road.

Herein, the controller 150 may be configured to correct the wheel speed of the rear wheels RL and RR or the front wheels FL and FR on the basis of the wheel speed of the one front wheel FC and the one rear wheel RC. When correcting the wheel speed, the controller 150 may be configured to operate a yaw rate sensor. Since there is a probability that a wheel speed will be incorrectly corrected according to the offset of the yaw rate sensor, the controller 150 may be configured to correct the wheel speed together with correcting the offset of the yaw rate sensor.

The controller 150 may be configured to calculate a relative speed of the tire and a resonance frequency of the tire based on the driving information and compare the calculated relative speed and the calculated resonance frequency with a previously learned determination reference value to finally determine whether the tire is deflated. A detail description will be given with reference to FIGS. 5 to 7. FIGS. 5 to 7 illustrate logic tables for determining tire deflation depending on a tire drive technique.

FIG. 5 illustrates a logic table for determining tire deflation when any one of three tires is driven according to a tire drive technique. When one tire is driven according to the tire drive technique, a controller 150 of FIG. 1 may be configured to calculate a resonance frequency of a driving wheel (e.g., a front wheel FC or a rear wheel RC). The calculated resonance frequency may be used to determine whether a tire of the driving wheel is deflated. The controller 150 may be configured to combine whether the resonance frequency of the driving wheel is reduced and the compared result of a relative speed for the driving wheel to determine the number of tires which are deflated. Furthermore, when the compared results of a first relative speed, a second relative speed, and a third relative speed are the same, it may be difficult for the controller 150 to determine whether the tire is deflated. However, in response to determining that the resonance frequency is reduced as the compared result of the resonance frequency, the controller 150 may be configured to determine that the tire is deflated.

FIG. 6 illustrates a logic table for determining tire deflation when at least two of three tires are driven according to a tire drive technique. As shown in FIG. 6, when two tires are driven, a controller 150 of FIG. 1 may be configured to calculate a resonance frequency for driving wheels (e.g., two rear wheels RL and RR or two front wheels FL and FR). The calculated resonance frequency may be used to determine whether tires of the driving wheels are deflated. The controller 150 may be configured to combine whether the resonance frequency of the driving wheels is reduced and the compared results of relative speeds for the driving wheels to determine the number of tires which are deflated.

FIG. 7 illustrates a logic table for determining tire deflation when three tires are driven according to a tire drive technique. As shown in FIG. 7, when the three tires are driven, a controller 150 of FIG. 1 may be configured to calculate a resonance frequency for driving wheels (e.g., one front wheel FC and two rear wheels RL and RR or two front wheels FL and FR and one rear wheel RC). The calculated resonance frequency may be used to determine whether tires of the driving wheels are deflated. The controller 150 may be configured to combine whether the resonance frequency of the driving wheels is reduced and the compared results of relative speeds for the driving wheels to determine the number of tires which are deflated. In response to determining that at least any one of the three tires is deflated, the controller 150 may be configured to output a warning using audio or an image via an output device 130 of FIG. 1

Figure 8:
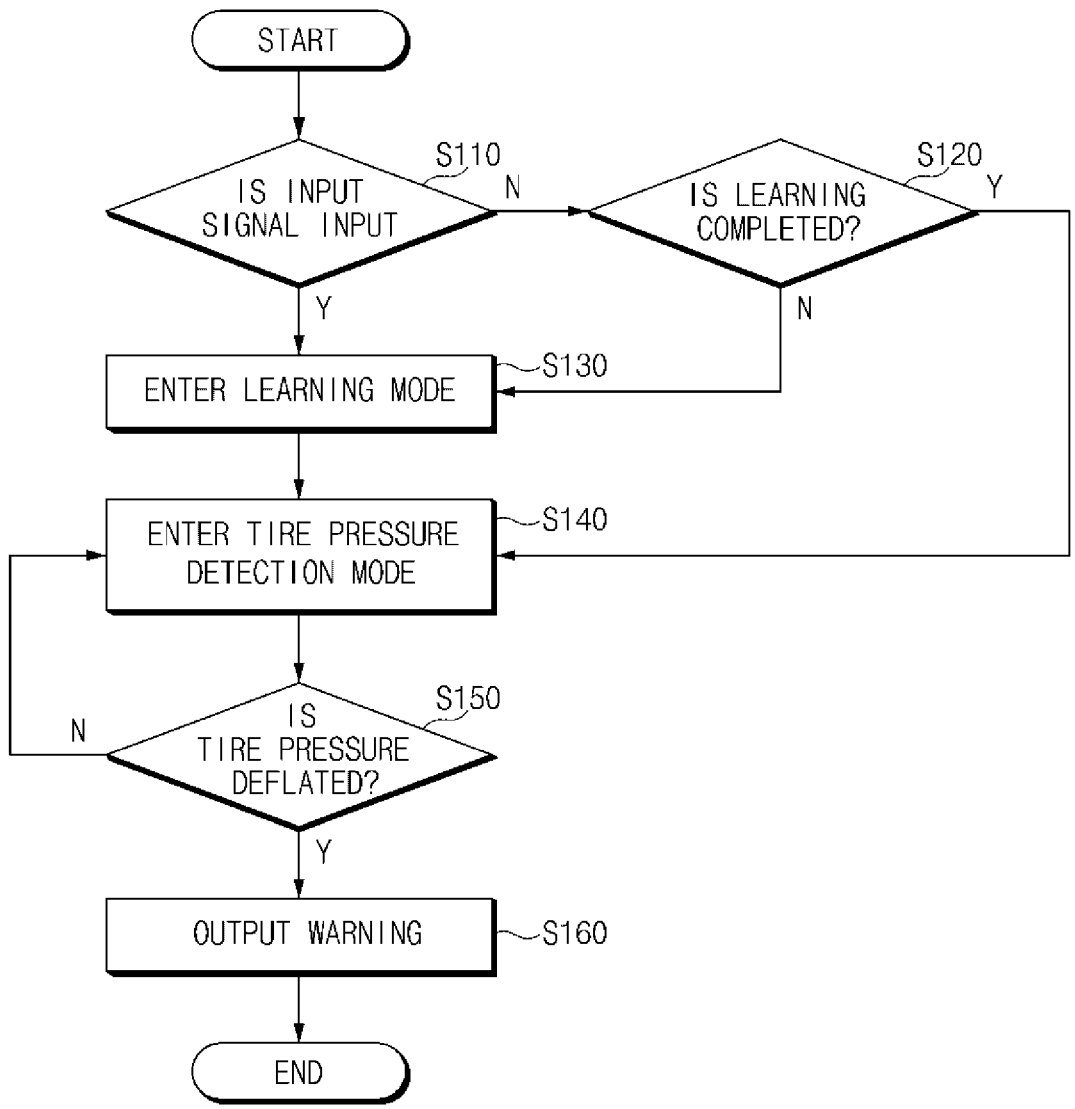
FIG. 8 is a flowchart illustrating an operation of an apparatus for providing tire information according to an exemplary embodiment of the present disclosure.

FIG. 8 is a flowchart illustrating an operation of an apparatus for providing tire information according to an exemplary embodiment of the present disclosure. As shown in FIG. 8, in S110, a controller 150 of FIG. 1 may be configured to determine whether an input signal is input to an input device 110 of FIG. 1. In response to determining that the input signal is input to the input device 110 in S110 (Y), in S130, the controller 150 may enter a learning mode. Meanwhile, in response to determining that the input signal is not input to the input device 110 (N), in S120, the controller 150 may be configured to determine whether the learning is completed. In response to determining that the learning is completed in S120 (Y), in S140, the controller 150 may enter a tire pressure detection mode. In response to determining that the learning is not completed (N), in S130, the controller 150 may enter the learning mode.

In S130, the controller 150 may be configured to calculate a relative speed of a tire based on driving information collected during a particular time period after the input signal is input to learn a relative speed determination reference value and may be configured to calculate a resonance frequency of a driving wheel to learn a resonance frequency determination reference value. Furthermore, in S140, the controller 150 may be configured to calculate a relative speed based on driving information obtained after entering the tire pressure detection mode, calculate a resonance frequency of the driving wheel, and compare the calculated relative speed and the calculated resonance frequency with a previously learned determination reference value. In S150, the controller 150 may be configured to determine whether the tire is deflated, based on the compared result in S140. In response to determining that the tire is deflated in S150 (Y), in S160, the controller 150 may be configured to output a warning. Meanwhile, in response to determining that the tire is not deflated in S150 (N), the controller 150 may be configured to perform S140.

Figure 9:
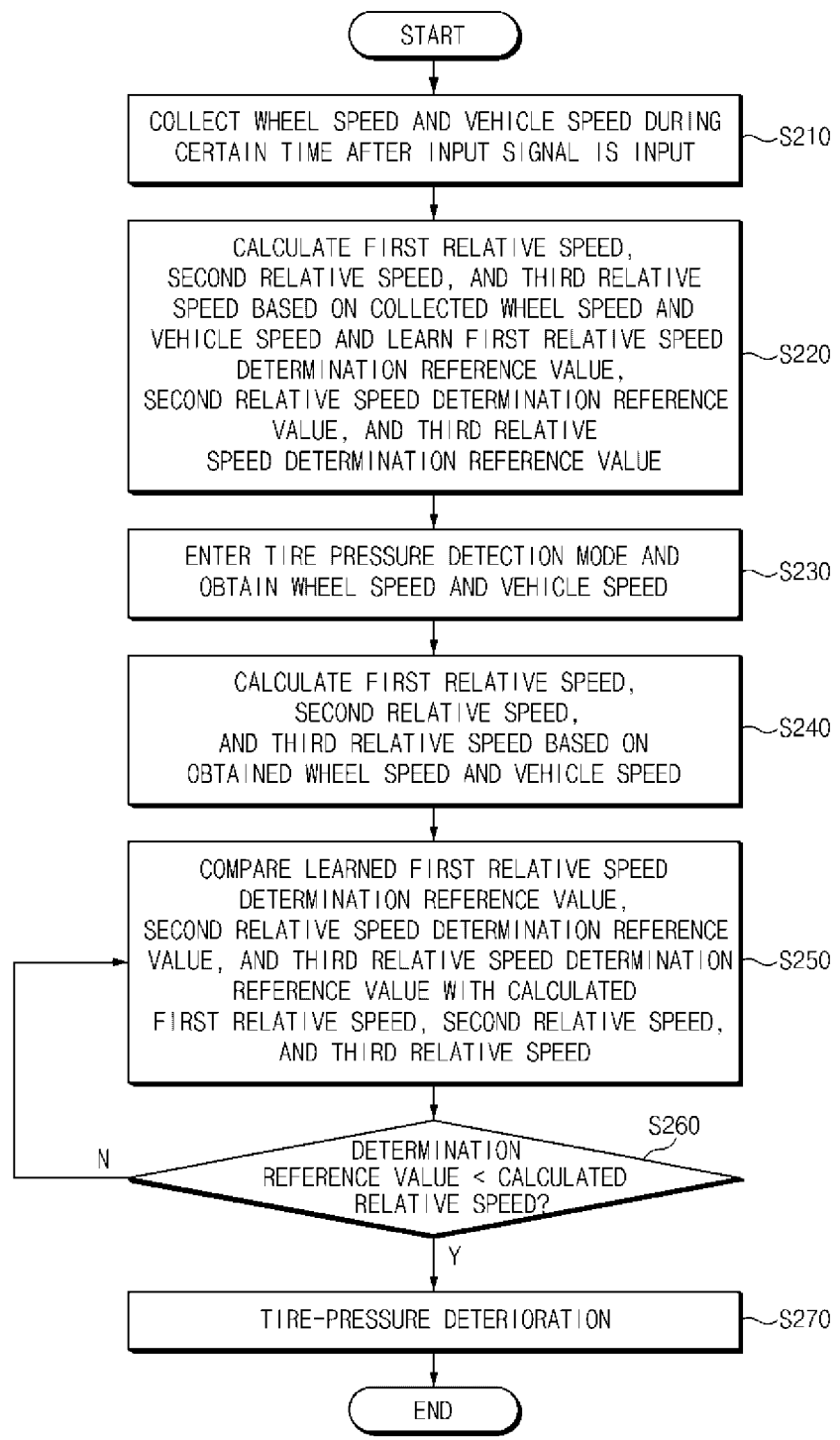
FIG. 9 is a flowchart illustrating a detailed operation of determining whether a tire is deflated, based on a learned relative speed determination reference value, according to an exemplary embodiment of the present disclosure.

A description will be given of S130 to S150 with reference to FIG. 9. FIG. 9 is a flowchart illustrating a detailed operation of determining whether a tire is deflated, based on a learned relative speed determination reference value, according to an exemplary embodiment of the present disclosure. As shown in FIG. 9, in S210, a controller 150 of FIG. 1 may be configured to collect driving information during a particular time period after an input signal is input. The driving information in S210 may include a wheel speed of a tire and a vehicle speed.

In S220, the controller 150 may be configured to calculate a first relative speed, a second relative speed, and a third relative speed based on the collected information and learn a first relative speed determination reference value, a second relative speed determination reference value, and a third relative speed determination reference value. When tires includes one front wheel FC and two rear wheels RL and RR, in S220, the controller 150 may be configured to obtain a result value calculated with: (a wheel speed of the front wheel FC–a wheel speed of the rear wheel RL)/a wheel speed as the first relative speed and learn the first relative speed determination reference value based on the calculated result value.

Furthermore, the controller 150 may be configured to obtain a result value calculated with: (a wheel speed of the left rear wheel RL–a wheel speed of the right rear wheel RR)/a wheel speed as the second relative speed and learn the second relative speed determination reference value based on the calculated result value. Additionally, the controller 150 may be configured to obtain a result value calculated with: (a wheel speed of the right rear wheel RR–a wheel speed of the front wheel FC)/a wheel speed as the third relative speed and learn the third relative speed determination reference value based on the calculated result value. In S230, the controller 150 may be configured to enter a tire pressure detection mode and obtain driving information.

In S240, the controller 150 may be configured to calculate a first relative speed, a second relative speed, and a third relative speed based on the information obtained in S230. The calculation performed in S240 may be performed in the same manner as that where the controller 150 calculates the first relative speed, the second relative speed, and the third relative speed in S220. In S250, the controller 150 may be configured to compare the first relative speed determination reference value, the second relative speed determination reference value, and the third relative speed determination reference value, which are learned in S220, with the first relative speed, the second relative speed, and the third relative speed, which are calculated in S240, respectively.

In S260, the controller 150 may be configured to determine whether the relative speed calculated in S240 is greater than the determination reference value learned in S220. In response to determining that the relative speed calculated in S240 is greater than the determination reference value learned in S220 in S260 (Y), in S270, the controller 150 may be configured to determine that the tire is deflated. In response to determining that the relative speed calculated in S240 is less than or equal to the determination reference value learned in S220 in S260 (N), the controller 150 may be configured to perform S250.

Figure 10:
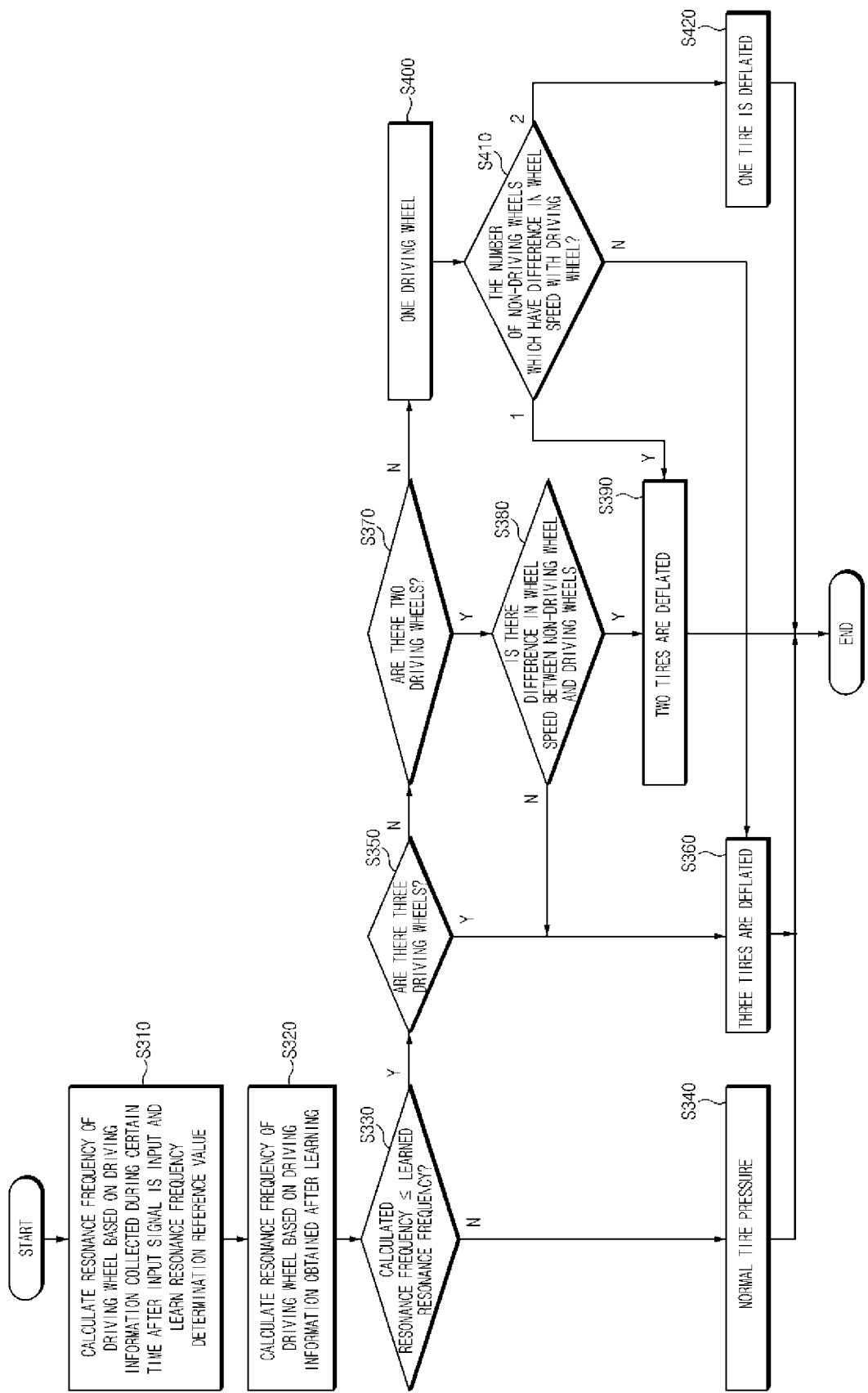
FIG. 10 is a flowchart illustrating a detailed operation of determining whether a tire is deflated, based on a learned resonance frequency determination reference value, according to an exemplary embodiment of the present disclosure.

FIG. 10 is a flowchart illustrating a detailed operation of determining whether a tire is deflated, based on a learned resonance frequency determination reference value, according to an exemplary embodiment of the present disclosure. As shown in FIG. 10, in S310, a controller 150 of FIG. 1 may be configured to calculate a resonance frequency of a driving wheel based on driving information collected during a certain time after an input signal is input and learn a resonance frequency determination reference value. Since the resonance frequency may be calculated for the driving wheel and but not easily calculated for a non-driving wheel, the controller 150 may be configured to calculate the resonance frequency based on the driving wheel driven according to a tire drive technique and learn the resonance frequency determination reference value.

In S320, the controller 150 may be configured to obtain driving information detected by a detector 120 of FIG. 1 after the learning is performed and may be configured to calculate a resonance frequency of the driving wheel based on the obtained driving information. In S330, the controller 150 may be configured to compare the resonance frequency calculated in S320 with the resonance frequency determination reference value learned in S310 to determine whether the resonance frequency calculated in S320 is less than or equal to the resonance frequency determination reference value learned in S310.

In response to determining that the resonance frequency calculated in S320 is greater than the resonance frequency determination reference value learned in S310 in S330 (N), in S340, the controller 150 may be configured to determine that the tire has normal tire pressure. In response to determining that the resonance frequency calculated in S320 is less than or equal to the resonance frequency determination reference value learned in S310 in S330 (Y), in S350, the controller 150 may be configured to determine whether there are three driving wheels.

In response to determining that there are the three driving wheels in S350 (Y), in S360, the controller 150 may be configured to determine that a resonance frequency calculated for the three driving wheels is reduced and may thus determine that three tires are deflated. Meanwhile, in response to determining that there are not the three driving wheels in S350 (N), in S370, the controller 150 may be configured to determine whether there are two driving wheels.

In response to determining that there are the two driving wheels in S370 (Y), in S380, the controller 150 may be configured to determine whether there is a difference in wheel speed between a non-driving wheel and the driving wheels. In response to determining that there is the difference in wheel speed between the non-driving wheel and the driving wheels in S380 (Y), in S390, the controller 150 may be configured to determine that a resonance frequency calculated for the two driving wheels is reduced and thus determine that only two tires are deflated.

Further, in response to determining that there is no difference in wheel speed between the non-driving wheel and the driving wheels in S380 (N), since it is determined that the two tires are deflated as the resonance frequency calculated for the two driving wheels is reduced and that wheel speeds of the two tires which are deflated are the same with respect to the non-driving wheel, in S360, the controller 150 may be configured to determine that the three tires are deflated. Meanwhile, in response to determining that there are not the two driving wheels in S370 (N), in S400, the controller 150 may be configured to determine that there is one driving wheel. When there is the one driving wheel in S400, the controller 150 may be configured to determine that a resonance frequency calculated for the one driving wheel is reduced.

Additionally, when there is the one driving wheel, in S410, the controller 150 may be configured to determine the number of non-driving wheels which have a difference in wheel speed with the driving wheel. When the number of the non-driving wheels which have the difference in wheel speed with the driving wheel is 0 in S410, the controller 150 may be configured to determine that a wheel speed of the driving wheel is the same as those of the two non-driving wheels. Thus, when the controller 150 determines that a resonance frequency of the driving wheel is reduced to determine that the tire of the driving wheel is deflated, the controller 150 may be configured to determine that the tire of the non-driving wheel determined as having the same wheel speed as the driving wheel is deflated. Thus, in S360, the controller 150 may be configured to determine that the three tires are deflated.

When the number of the non-driving wheels which have the difference in wheel speed with the driving wheel is 1 in S410, the controller 150 may be configured to determine that one of the two non-driving wheels has the difference in wheel speed with the driving wheel and that the other does not have the difference in wheel speed with the driving wheel. Thus, the controller 150 may be configured to determine that the tire of the non-driving wheel which does not have the difference in wheel speed with the driving wheel is deflated and determine that the tire of the non-driving wheel which has the difference in wheel speed with the driving wheel is not deflated. Therefore, when the number of non-driving wheels which have the difference in wheel speed with the driving wheel is 1, in S390, the controller 150 may be configured to determine that two tires are deflated.

When the number of the non-driving wheels which have the difference in wheel speed with the driving wheel is 2 in S410, the controller 150 may be configured to determine that the driving wheel and the two non-driving wheels have a difference in wheel speed. Thus, when the controller 150 determines that a resonance frequency of the driving wheel is reduced to determine that the tire of the driving wheel is deflated, the controller 150 may be configured to determine that the tire of the non-driving wheel determined as having the difference in wheel speed with the driving wheel is not deflated. Therefore, in S420, the controller 150 may be configured to determine that the tire of the one driving wheel is deflated.

Figure 11:
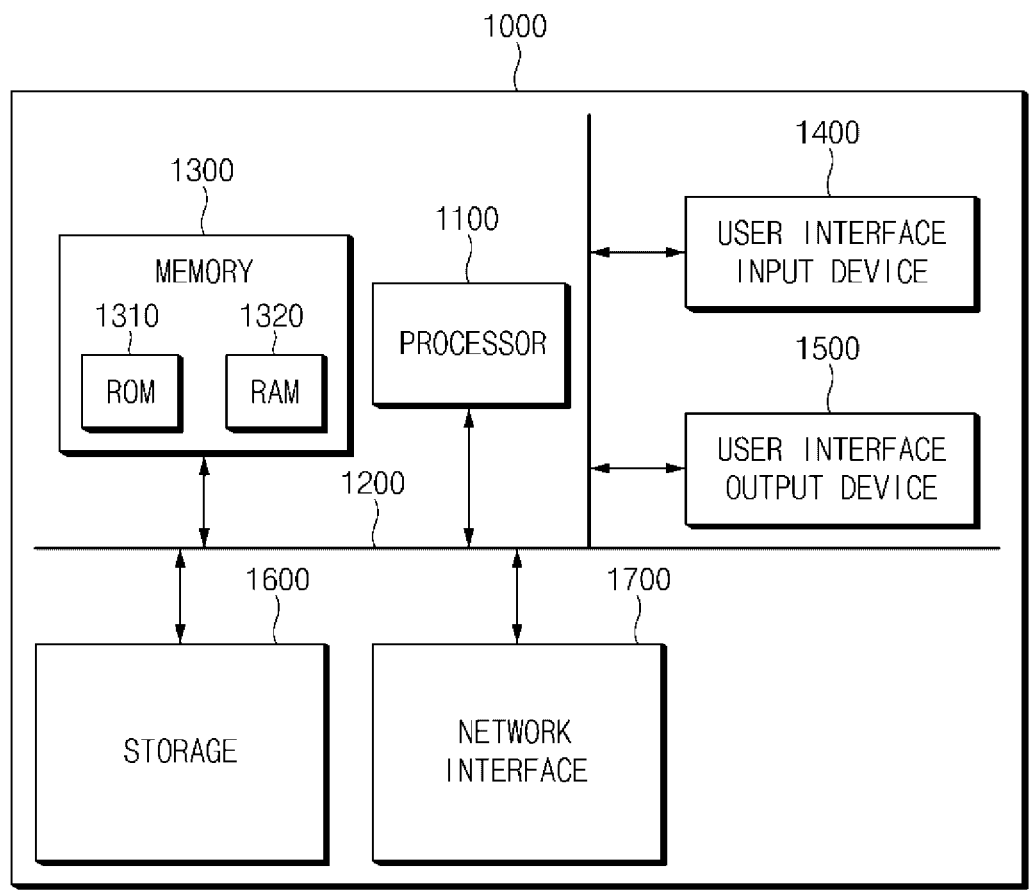
FIG. 11 is a block diagram illustrating a computing system which executes a method according to an exemplary embodiment of the present disclosure.

FIG. 11 is a block diagram illustrating a computing system which executes a method according to an exemplary embodiment of the present disclosure. Referring to FIG. 11, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the exemplary embodiments disclosed herein may be embodied directly in hardware or a software module executed by the processor 1100, or in a combination thereof. The software module may reside on a storage medium (that is, the memory 1300 and/or the storage 1600) such as a RAM memory, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an exemplary embodiment of the present disclosure, the apparatus and method for providing tire information may be configured to identify tire pressure without having a separate tire pressure sensor to manage tire pressure of a three-wheeled mobility and may support safe driving of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

What is claimed is:

1. An apparatus for providing tire information, comprising:
    a detector configured to detect driving information as a vehicle is being driven; and
    a controller configured to calculate a relative speed of a tire of the vehicle and a resonance frequency of the tire based on the driving information when a tire pressure detection mode is entered and compare the calculated relative speed and the calculated resonance frequency with a previously learned determination reference value to determine whether the tire is deflated,
    wherein the relative speed includes a first relative speed between a front wheel and a left rear wheel, a second relative speed between the left rear wheel and a right rear wheel, and a third relative speed between the right rear wheel and the front wheel, when the tire includes the one front wheel, the left rear wheel, and the right rear wheel,
    wherein the first relative speed is calculated by dividing a difference between a wheel speed of the front wheel and a wheel speed of the left rear wheel by a speed of the vehicle detected using a speed sensor included in the detector,
    wherein the second relative speed is calculated by dividing a difference between the wheel speed of the left rear wheel and a wheel speed of the right rear wheel by the speed of the vehicle detected using the speed sensor included in the detector,
    wherein the third relative speed is calculated by dividing a difference between the wheel speed of the right rear wheel and the wheel speed of the front wheel by the speed of the vehicle detected using the speed sensor included in the detector,
    wherein the controller is configured to output a warning in response to determining that the tire is deflated;
    wherein the controller is configured to enter a learning mode and learn the determination reference value when an input signal is input to an input device;
    wherein the controller is configured to determine whether the learning is completed, when the input signal is not input from a user,
    wherein the controller is configured to enter the tire pressure detection mode when the learning is completed,
    wherein the controller is configured to output the warning via an output device in response to determining that at least one of three tires is deflated,
    wherein the determination reference value includes a first relative speed determination reference value, a second relative speed determination reference value, and a third relative speed determination reference value, which are learned after the first relative speed, the second relative speed, and the third relative speed are calculated based on the driving information collected during the particular time period after the input signal is input from the user, when the tire includes the one front wheel, the left rear wheel, and the right rear wheel; and
    wherein the controller is configured to identify the tire pressure without having a tire pressure sensor to manage tire pressure of a three wheeled mobility.

2. The apparatus of claim 1, wherein the tire includes one front wheel, a left rear wheel, and a right rear wheel or includes a left front wheel, a right front wheel, and one rear wheel.

3. The apparatus of claim 1, wherein the driving information includes at least any one of an angular velocity, a wheel speed, a vehicle speed, and a yaw rate of the tire.

4. The apparatus of claim 1, wherein the controller is configured to determine that the tire is deflated, when the relative speed of the tire is greater than the previously learned determination reference value.

5. The apparatus of claim 1, wherein the controller is configured to calculate a resonance frequency of a driving tire based on the driving information collected during a particular time period after an input signal is input to an input device and learn a resonance frequency determination reference value.

6. The apparatus of claim 5, wherein the controller is configured to calculate a resonance frequency of the driving tire, after learning the resonance frequency determination reference value, compare the learned resonance frequency determination reference value with the calculated resonance frequency to determine whether the driving tire is deflated, and determine whether there is a difference in wheel speed between the driving tire and a non-driving tire to determine whether the non-driving tire is deflated.

7. The apparatus of claim 1, wherein the controller is configured to determine whether there is a change in weight of the vehicle and determine whether the tire is deflated by reflecting the changed weight when there is the change in weight of the vehicle.

8. A method for providing tire information, comprising:
    detecting, by a detector, driving information as a vehicle is being driven; and
    calculating, by the controller, a relative speed of a tire of the vehicle and a resonance frequency of the tire based on the driving information when a tire pressure detection mode is entered and comparing the calculated relative speed and the calculated resonance frequency with a previously learned determination reference value to determine whether the tire is deflated,
    wherein the relative speed includes a first relative speed between a front wheel and a left rear wheel, a second relative speed between the left rear wheel and a right rear wheel, and a third relative speed between the right rear wheel and the front wheel, when the tire includes the one front wheel, the left rear wheel, and the right rear wheel,
    wherein the first relative speed is calculated by dividing a difference between a wheel speed of the front wheel and a wheel speed of the left rear wheel by a speed of the vehicle detected using a speed sensor included in the detector,
    wherein the second relative speed is calculated by dividing a difference between the wheel speed of the left rear wheel and a wheel speed of the right rear wheel by the speed of the vehicle detected using the speed sensor included in the detector,
    wherein the third relative speed is calculated by dividing a difference between the wheel speed of the right rear wheel and the wheel speed of the front wheel by the speed of the vehicle, detected using the speed sensor included in the detector,
    outputting, by the controller, a warning in response to determining that the tire is deflated,
    wherein the controller is configured to enter a learning mode and learn the determination reference value when an input signal is input to an input device;
    wherein the controller is configured to determine whether the learning is completed, when the input signal is not input from a user, wherein the controller is configured to enter the tire pressure detection mode when the learning is completed, and wherein the controller is configured to output the warning via an output device in response to determining that at least one of three tires is deflated;

wherein the determination reference value includes a first relative speed determination reference value, a second relative speed determination reference value, and a third relative speed determination reference value, which are learned after the first relative speed, the second relative speed, and the third relative speed are calculated based on the driving information collected during the particular time period after an input signal is input from the user, when the tire includes the one front wheel, the left rear wheel, and the right rear wheel; and wherein the controller is configured to identify the tire pressure without having a tire pressure sensor to manage tire pressure of a three wheeled mobility.

9. The method of claim 8, wherein the tire includes one front wheel, a left rear wheel, and a right rear wheel or includes a left front wheel, a right front wheel, and one rear wheel.

10. The method of claim 8, wherein the driving information includes at least any one of an angular velocity, a wheel speed, a vehicle speed, and a yaw rate of the tire.

11. The method of claim 8, wherein the determining whether the tire is deflated includes:
determining, by the controller, that the tire is deflated, when the relative speed of the tire is greater than the previously learned determination reference value.

12. The method of claim 8, further comprising:
calculating, by the controller, a resonance frequency of a driving tire based on the driving information collected during a particular time period after an input signal is input and learning a resonance frequency determination reference value.

13. The method of claim 12, further comprising:
calculating, by the controller, a resonance frequency of the driving tire, after learning the resonance frequency determination reference value;
comparing, by the controller, the learned resonance frequency determination reference value with the calculated resonance frequency to determine whether the driving tire is deflated; and
determining, by the controller, whether there is a difference in wheel speed between the driving tire and a non-driving tire to determine whether the non-driving tire is deflated.

14. The method of claim 8, further comprising:
determining, by the controller, whether there is a change in weight of the vehicle; and
determining, by the controller, whether the tire is deflated by reflecting the changed weight, when there is the change in weight of the vehicle.

* * * * *